(12) United States Patent
Pei

(10) Patent No.: US 8,329,032 B2
(45) Date of Patent: Dec. 11, 2012

(54) LIQUID PURIFYING APPARATUS

(75) Inventor: Shao-Kai Pei, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 271 days.

(21) Appl. No.: 12/824,244

(22) Filed: Jun. 28, 2010

(65) Prior Publication Data

US 2011/0297607 A1 Dec. 8, 2011

(30) Foreign Application Priority Data

Jun. 4, 2010 (TW) ................................. 99118025

(51) Int. Cl.
*C02F 1/28* (2006.01)

(52) U.S. Cl. ........ 210/236; 210/237; 210/330; 210/359; 210/502.1; 422/222

(58) Field of Classification Search .................. 210/150, 210/198.1, 359, 502.1, 748.14, 236, 237, 210/330; 422/186.3, 222; 250/433
See application file for complete search history.

(56) References Cited

U.S. PATENT DOCUMENTS

| | | | | |
|---|---|---|---|---|
| 1,052,818 A | * | 2/1913 | Helbronner et al. | 250/433 |
| 3,790,350 A | * | 2/1974 | Haensel | 422/222 |
| 5,501,801 A | * | 3/1996 | Zhang et al. | 210/748.14 |
| 6,063,343 A | * | 5/2000 | Say et al. | 422/186.3 |
| 6,613,225 B1 | * | 9/2003 | Toyoda et al. | 210/205 |
| 2004/0156704 A1 | * | 8/2004 | Heynssens | 414/540 |
| 2005/0008549 A1 | * | 1/2005 | Hsu | 422/186 |
| 2011/0297602 A1 | * | 12/2011 | Pei | 210/205 |

FOREIGN PATENT DOCUMENTS

| | | | | |
|---|---|---|---|---|
| JP | 2005177700 A | * | 7/2005 | |
| WO | WO0112562 A | * | 2/2001 | |

* cited by examiner

*Primary Examiner* — Matthew Savage
(74) *Attorney, Agent, or Firm* — Altis Law Group, Inc.

(57) ABSTRACT

An exemplary liquid purifying apparatus includes beads in contact with the liquid, a rotating shaft, and a driving member. Each bead has a purifying coating comprised of a nano material. The rotating shaft has the beads positioned thereon and is configured for rotating the beads. The driving member is configured for driving the rotating shaft to rotate, thereby rotating the beads in the liquid.

17 Claims, 2 Drawing Sheets

LIQUID PURIFYING APPARATUS

CROSS-REFERENCE TO RELATED APPLICATION

This application is related to a commonly-assigned co-pending U.S. patent application Ser. No. 12/825,356 filed on Jun. 29, 2010 entitled "liquid purifying apparatus and substrate cleaning apparatus", still pending. The disclosure of the above-identified application is incorporated herein by reference.

BACKGROUND

1. Technical Field

The present disclosure relates to a liquid purifying apparatus.

2. Description of Related Art

Liquids, such as sewage and petroleum, have a lot of impurities which are poisonous and deleterious and need to be purified before they can be safely used.

Various liquid purifying apparatuses in use are large complicated systems and involve long processes. It is known that during the long purifying process ambient contaminants around the apparatus may easily enter the liquid.

What is needed, therefore, is a liquid purifying apparatus which can overcome the above shortcomings.

BRIEF DESCRIPTION OF THE DRAWINGS

Many aspects of the present liquid purifying apparatus can be better understood with reference to the following drawings. The components in the drawings are not necessarily drawn to scale, the emphasis instead being placed upon clearly illustrating the principles of the present liquid purifying apparatus. Moreover, in the drawings, like reference numerals designate corresponding parts throughout the several views.

DETAILED DESCRIPTION

Embodiments of the present liquid purifying apparatus will now be described in detail below and with reference to the drawings.

Figure 1:
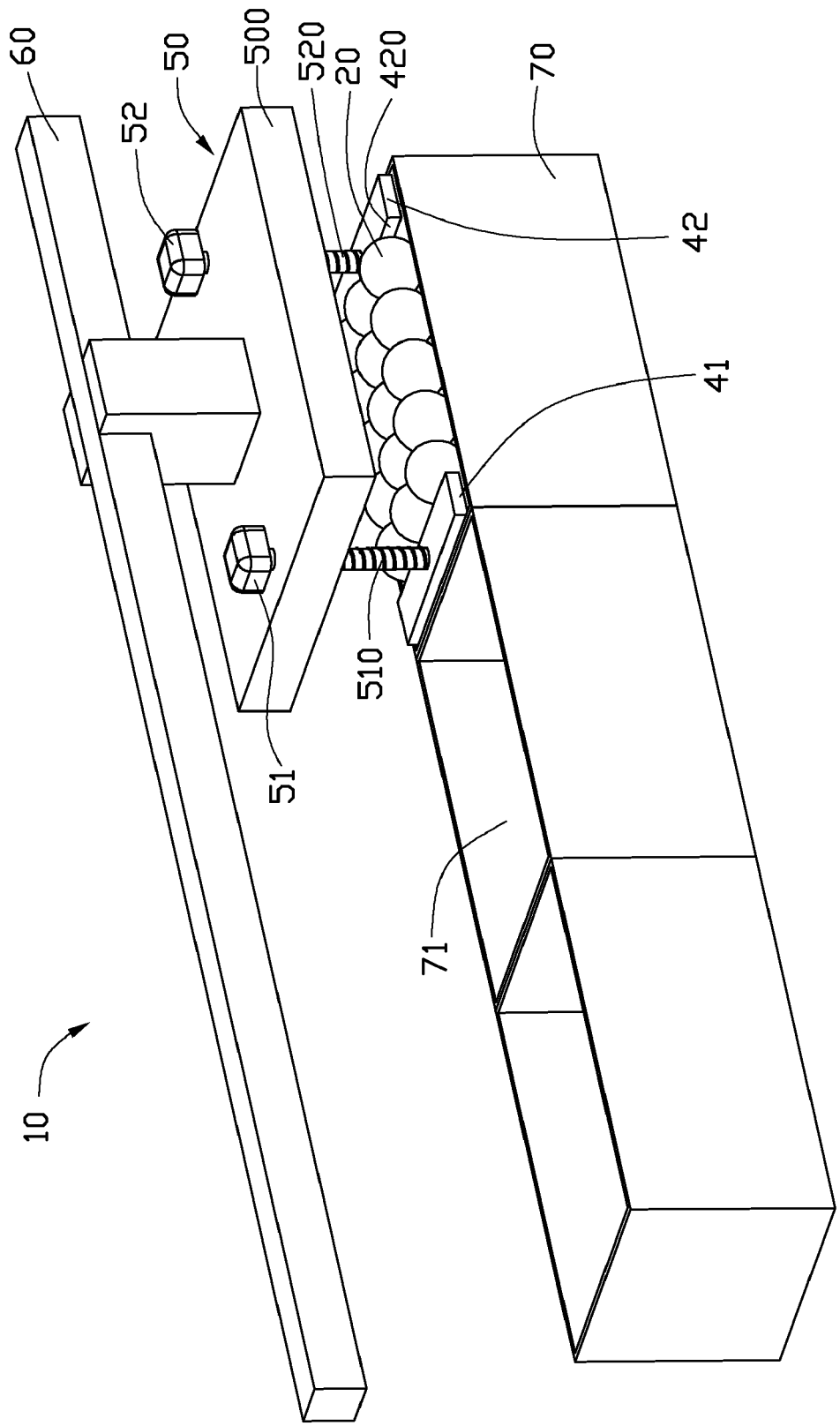
FIG. 1 is an isometric view of a liquid purifying apparatus in accordance with an exemplary embodiment.
Figure 2:
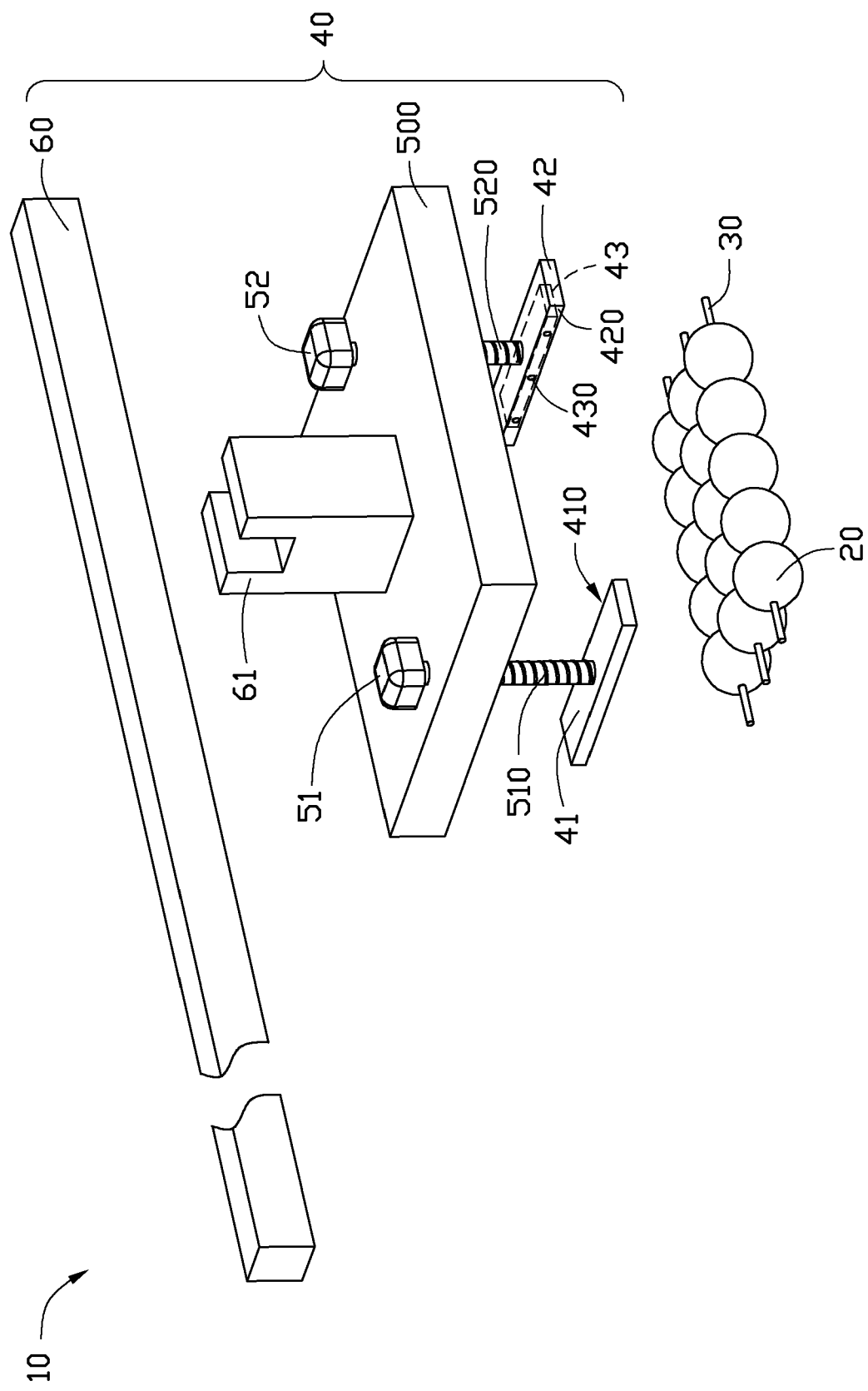
FIG. 2 is a partially exploded view of the liquid purifying apparatus shown in FIG. 1.

Referring to FIGS. 1 and 2, an exemplary liquid purifying apparatus 10 for purifying liquids such as sewage and petroleum, is provided. The liquid purifying apparatus 10 includes a plurality of beads 20, a plurality of rotating shafts 30, a driving member 40 and a container 70.

Each bead 20 is made of a ceramic material such as aluminum oxide ($Al_2O_3$), and has an activated carbon coating and a purifying coating formed in sequence on the entire surface of each bead 20. That is, the activated carbon coating is the inner layer, the purifying coating is the outer layer. The beads 20 are substantially round, and a diameter of each bead 20 is in a range from 5 cm to 15 cm, and a total thickness of the activated carbon coating and the purifying coating is in a range from 55 nm to 100 nm. The beads 20 each can have a large specific surface area to contact the liquid.

The purifying coating is made of a nano material selected from a group consisting of titanium dioxide ($TiO_2$), ruthenium dioxide ($RuO_2$), cobalt-titanium oxide ($CoTiO_3$), zirconium-cerium oxide ($Zr_{0.5}Ce_{10.5}O_2$) and a combination thereof. The nano material has a high specific surface area. The activated carbon coating is porous and has a high absorption capability. The cooperation of the activated carbon coating and the purifying coating made of any of the above nano materials can have a good capability of removing impurities from the liquid, such as by absorbing and decomposing certain organic materials into water and carbon dioxide ($CO_2$). Oxidation-reduction reaction may be enhanced by introducing the proper amounts of water and light to the process. In particular, the $CoTiO_3$ is a good desulfurizer when used to purify petroleum. The activated carbon coating further purifies the liquid.

The rotating shafts 30 are parallel with each other and each extends through a plurality of the beads 20. In this way, the beads 20 are positioned on the rotating shafts 30 in contact one another and are substantially arranged on a common plane.

The driving member 40 includes a guide rail 60, a lifting device 50, a first block 41, a second block 42, and a rotating motor 43. The rotating motor 43 is mounted in the second block 42. The first block 41 has a side surface 410 facing the second block 42, and the second block 42 has a side surface 420 facing the first block 41. The side surfaces 410, 420 each have a plurality of holes 430 formed therein. The rotating shafts 30 extend through the holes 430 and are connected to the rotating motor 43. In this way, the rotating shafts 30 together with the beads 20 can be driven to rotate by the rotating motor 43. The rotation can be about 180 degrees or about 360 degrees. The rotation ensures full involvement of all cleaning surfaces in the absorption, decomposition, and other reactions of the purifying process.

The container 70 is used to contain the liquid, and can include a plurality of sections 71 for containing different liquids. The beads 20 are placed in contact with and rotated in the liquid to remove impurities from the liquid. The beads 20 and the container 70 can be configured so that the beads 20 cover most if not the entire surface of the liquid in the container 70, thus preventing ambient gas pollutants such as carbon monoxide (CO) and sulfur dioxide ($SO_2$) from entering the liquid.

The lifting device 50 includes a platform 500, an engaging block 61 formed on the platform 500, and a first lifting motor 51 and a second lifting motor 52 both mounted on the platform 500. The lifting device 50 is slidably mounted on the guide rail 60 through the engaging block 61. The first lifting motor 51 has a first shaft 510 connected to the first block 41, and the second lifting motor 52 has a second shaft 520 connected to the second block 42. The first lifting motor 51 and the second lifting motor 52 can help position the beads 20 in the liquid and remove the beads 20 from the liquid in the purification process.

It is understood that in several situations, only one rotating shaft is workable once the beads are positioned to cover and contact the surface of the liquid.

With the above liquid purifying apparatus 10, the liquid can be purified without large complicated systems and long process.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A liquid purifying apparatus for purifying liquid, comprising:

a plurality of beads;

a purifying coating comprised of a nano material formed on each bead;

at least one rotating shaft extending through the beads and configured for rotating the beads; and a driving member comprising:

a first block and a second block with the beads located therebetween;

a rotating motor mounted in the second block and connected to the at least one rotating shaft, the rotating motor configured for driving the at least one rotating shaft to rotate, thereby rotating the beads in the liquid; and a lifting device comprising a platform, and a first lifting motor and a second lifting motor both mounted on the platform, the first lifting motor having a first shaft connected to the first block, and the second lifting motor having a second shaft connected to the second block.

2. The liquid purifying apparatus of claim 1, wherein the at least one rotating shaft comprises a plurality of rotating shafts parallel with each other.

3. The liquid purifying apparatus of claim 2, wherein the beads are in contact with one another and are substantially arranged on a common plane.

4. The liquid purifying apparatus of claim 1, wherein the beads are made of a ceramic material, and the nano material is selected from a group consisting of titanium dioxide, ruthenium dioxide, cobalt-titanium oxide, zirconium-cerium oxide and any combination thereof.

5. The liquid purifying apparatus of claim 4, wherein each bead further comprises a layer of activated carbon underlaying the purifying coating.

6. The liquid purifying apparatus of claim 1, wherein the driving member further comprises a guide rail for the platform to slide along.

7. The liquid purifying apparatus of claim 1, further comprising a container containing the liquid.

8. The liquid purifying apparatus of claim 7, wherein the beads are arranged on the entire surface of the liquid in the container.

9. A liquid purifying apparatus for purifying liquid, comprising:

a plurality of beads for coming into contact with the liquid, an activated carbon layer formed on each bead;

a nano material purifying coating formed on the activated carbon layer;

a plurality of rotating shafts extending through the beads and configured for rotating the beads, the beads being in contact with each other; and a driving member comprising:

a first block and a second block with the beads located therebetween;

a rotating motor mounted in the second block and connected to the at least one rotating shaft, the rotating motor configured for driving the rotating shafts to rotate, thereby rotating the beads in the liquid; and a lifting device comprising a platform, and a first lifting motor and a second lifting motor both mounted on the platform, the first lifting motor having a first shaft connected to the first block, and the second lifting motor having a second shaft connected to the second block.

10. The liquid purifying apparatus of claim 9, wherein a diameter of each bead is in a range from 5 cm to 15 cm, and a total thickness of the activated carbon layer and the purifying coating is in a range from 55 nm to 100 nm.

11. The liquid purifying apparatus of claim 9, wherein the beads are made of a ceramic material, and the purifying coating is made of a nano material selected from a group consisting of titanium dioxide, ruthenium dioxide, cobalt-titanium oxide, zirconium-cerium oxide and any combination thereof.

12. The liquid purifying apparatus of claim 9, wherein the driving member further comprises a guide rail for the platform to slide on.

13. The liquid purifying apparatus of claim 9, further comprising a container containing the liquid.

14. The liquid purifying apparatus of claim 13, wherein the beads are arranged on the entire surface of the liquid in the container.

15. A liquid purifying apparatus comprising:

a plurality of containers for containing liquid therein;

a plurality of beads;

a nano material purifying coating formed on each of the beads;

a plurality of juxtaposed rotating shafts extending through the beads, the beads being fixed to the corresponding rotating shafts and substantially arranged on a horizontal plane;

a first driving device coupled to the opposite ends of the rotating shafts configured for driving the rotating shafts to revolve; and a second driving device coupled to the first driving device for vertically moving the first driving device and the beads relative to the containers.

16. The liquid purifying apparatus of claim 15, further comprising a guide rail engaged with the second driving device, the guide rail extending along the arrangement of containers and configured for guiding the second driving device to move along the containers.

17. The liquid purifying apparatus of claim 16, wherein each bead further comprises an activated carbon coating underlaying the purifying coating.

* * * * *